United States Patent
Longo et al.

(10) Patent No.: US 9,540,080 B2
(45) Date of Patent: Jan. 10, 2017

(54) METHOD OF FORMING A THERMOPLASTIC FIBER COMPOSITE FIN

(71) Applicant: TODOS SANTOS SURF, INC., Huntington Beach, CA (US)

(72) Inventors: Vince Longo, Huntington Beach, CA (US); Tony Longo, Laguna Niguel, CA (US); John Griffin, Huntington Beach, CA (US)

(73) Assignee: TODOS SANTOS SURF, INC., Huntington Beach, CA (US)

( * ) Notice: Subject to any disclaimer, the term of this patent is extended or adjusted under 35 U.S.C. 154(b) by 0 days.

(21) Appl. No.: 14/283,062

(22) Filed: May 20, 2014

(65) Prior Publication Data

US 2015/0336641 A1   Nov. 26, 2015

(51) Int. Cl.
  *B63B 35/79*   (2006.01)
  *B29C 65/70*   (2006.01)
  *B29C 70/30*   (2006.01)
  *B29C 70/42*   (2006.01)
  *B29C 70/86*   (2006.01)
  (Continued)

(52) U.S. Cl.
  CPC ........... *B63B 35/7906* (2013.01); *B29C 65/70* (2013.01); *B29C 70/30* (2013.01); *B29C 70/42* (2013.01); *B29C 70/865* (2013.01); *B32B 37/1018* (2013.01); *B32B 37/144* (2013.01); *B32B 37/26* (2013.01); *B63B 35/79* (2013.01); *B63B 35/7909* (2013.01); *B29K 2101/12* (2013.01); *B29K 2105/253* (2013.01); *B29K 2313/00* (2013.01); *B29L 2009/00* (2013.01); *B29L 2031/30* (2013.01); *B32B 2305/076* (2013.01); *B32B 2305/188* (2013.01); *B32B 2309/68* (2013.01);
  (Continued)

(58) Field of Classification Search
  CPC .. B63B 35/7906; B63B 35/7926; B63B 35/79; B29C 70/42; B29C 70/30; B29C 65/70; B29C 70/865; B32B 37/1018; B32B 37/26; B32B 37/144; B32B 2305/076; B32B 2309/68; B32B 2305/188; B29K 2105/253
  USPC ........................................ 441/65, 70, 74, 79
  See application file for complete search history.

(56) References Cited

U.S. PATENT DOCUMENTS

| | | | |
|---|---|---|---|
| 4,804,347 A | 2/1989 | Ross | |
| 4,964,825 A | 10/1990 | Paccoret et al. | |

(Continued)

FOREIGN PATENT DOCUMENTS

WO   2004101251 A1   11/2004

OTHER PUBLICATIONS

JAB Surfboards, Les Materiaux, http://www.jabsurfboards.com/technologie/les-materiaux/.

(Continued)

*Primary Examiner* — Anthony Wiest
(74) *Attorney, Agent, or Firm* — Stetina Brunda Garred & Brucker; Eric L. Tanezaki (57) ABSTRACT

A structure, such as a fin or water sports board, including a core having opposed first and second core outer surfaces. The structure further includes first and second fiber sheets, wherein the first fiber sheet extends along the first core outer surface and the second fiber sheet extends along the second core outer surface. A thermoplastic material impregnates the first fiber sheet and the second fiber sheet and bonds the first fiber sheet and the second fiber sheet to the core. The thermoplastic material defines an outer surface of the structure.

4 Claims, 4 Drawing Sheets

(51) Int. Cl.
  *B32B 37/10*   (2006.01)
  *B32B 37/14*   (2006.01)
  *B32B 37/26*   (2006.01)
  *B29K 101/12*  (2006.01)
  *B29K 105/00*  (2006.01)
  *B29L 9/00*    (2006.01)
  *B29L 31/30*   (2006.01)

(52) U.S. Cl.
  CPC ........ *B32B 2605/00* (2013.01); *B63B 35/7926* (2013.01)

(56) References Cited

U.S. PATENT DOCUMENTS

| | | | |
|---|---|---|---|
| 5,830,025 A | 11/1998 | Fleming | |
| 2004/0043680 A1* | 3/2004 | Mead | 441/74 |
| 2005/0184432 A1* | 8/2005 | Mead | 264/272.15 |
| 2006/0276087 A1* | 12/2006 | Conner | 441/74 |
| 2007/0202760 A1 | 8/2007 | Caldwell | |
| 2012/0196079 A1 | 8/2012 | Brauers et al. | |
| 2013/0244514 A1 | 9/2013 | Scott et al. | |

OTHER PUBLICATIONS

Thomas, Shane, PCT Notification of Transmittal of the International Search Report and the Written Opinion of the International Searching Authority or the Declaration, Jul. 10, 2015, pp. 1-18.

\* cited by examiner

METHOD OF FORMING A THERMOPLASTIC FIBER COMPOSITE FIN

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field of the Invention

The present invention relates generally to a water sports board and fin, and more specifically to a water sports board and fin each being formed from a thermoplastic composite structure.

Description of the Related Art

Surfboards and other water sports boards are well known as recreational devices for use in oceans, as well as other bodies of water. Such boards are typically elongate, plank-like structures, which allow a user to stand or otherwise be supported on the board during the recreational activity. Most surfboards, and other water sports boards, usually include one or more fins coupled to the board for stability and control.

The construction of the boards and the corresponding fins has evolved greatly over the years. Along these lines, some of the first boards were formed from balsa wood, although major improvements over the years led to the boards being formed of a foam core with a laminate, such as fiberglass with a laminating resin covering and sealing the core. Using more modern board manufacturing techniques, the foam core may be initially molded into a "blank" in the rough shape of the board. The blank may then be worked on by a shaper who cuts, planes and sands the blank to prescribed specifications. Once the blank is properly shaped, the blank may be covered in one or more layers of fiberglass cloth and resin.

The fin(s) may be coupled to the board using a fin mount which is configured to allow the fin to be detachably secured to the board. In order to install the fin mount into the board, the fin mount is typically positioned into the foam core. A laminate may be placed over portions of the mount to secure the fin mount to the board.

Once the board is constructed and is used by the user, significant forces may be imparted on the board, fin and/or fin mount during such use. With regard to the fin, the forces imparted thereon may cause the fin to flex, and as such, the fin's ability to return to its normal state after having the force applied may affect the performance of the fin and the board as a whole.

Conventional construction techniques and manufacturing materials for boards, fins and fin boxes have resulted in boards, fins and fin boxes which have failed (e.g., broken) during use. For instance, it is not uncommon for a fin to break away from the board or for the board itself to snap into two pieces. Furthermore, conventional techniques for manufacturing boards and fins tend to be extremely labor intensive and harmful to the environment.

Therefore, there is a need in the art for an improved construction for the water sports board and the fin which has an improved strength and durability. Various aspects of the present invention address these particular needs, as will be discussed in more detail below.

BRIEF SUMMARY

There is provided a structure, such as a fin or water sports board, and related method of manufacturing the structure, wherein the structure includes an inner core and an outer fiber sheet bonded to the inner core by a thermoplastic material. The outer fiber sheet provides enhanced strength and durability relative to conventional materials without compromising the structure's strength to weight ratio.

According to one embodiment, there is provided a fin for a water sports board. The fin includes a fin leading edge and a fin trailing edge, wherein the fin leading edge and the fin trailing edge converge at a fin tip portion. A base is attachable to the water sports board, with the base being opposite the fin tip portion and extending between the fin leading edge and the fin trailing edge. A core is coupled to the base and includes a first core outer surface and an opposing second core outer surface. The core includes a core leading region and a core trailing region, wherein the core leading region and core trailing region converge at a core tip region. The fin further includes a first fiber sheet including a first sheet leading region and a first sheet trailing region, wherein the first sheet leading region and first sheet trailing region converge at a first sheet tip region. The first fiber sheet extends along the first core outer surface with the first sheet tip region being disposed adjacent the core tip region. The fin additionally comprises a second fiber sheet including a second sheet leading region and a second sheet trailing region. The second sheet leading region and second sheet trailing region converge at a second sheet tip region. The second fiber sheet extends along the second core outer surface with the second sheet tip region being disposed adjacent the core tip region. A thermoplastic material impregnates the first fiber sheet and the second fiber sheet and bonds the first fiber sheet and the second fiber sheet to the core, the thermoplastic material defining or otherwise forming a fin outer surface including the fin leading edge and fin trailing edge.

The first fiber sheet and/or the second fiber sheet may include a plurality of interwoven structural strands. Alternatively, the first fiber sheet and/or the second fiber sheet may include non-woven structural strands, wherein the structural strands may be arranged in a substantially unidirectional arrangement.

According to another aspect of the invention, there is provided a water sports board comprising a board nose region, an opposed board tail region, and a pair of opposed rails extending between the board nose region and the board tail region. The water sports board further includes a core having a first core outer surface and an opposing second core outer surface. A first fiber sheet extends along the first core outer surface and a second fiber sheet extends along the second core outer surface. A thermoplastic material impregnates the first fiber sheet and the second fiber sheet. The thermoplastic material bonds the first fiber sheet and the second fiber sheet to the core, and defines or otherwise forms a board outer surface.

The core may include a core nose region and an opposed core tail region. The first fiber sheet may include a first sheet nose region and a first sheet tail region. The first fiber sheet may extend along the first core outer surface with the first sheet nose region disposed adjacent the core nose region and the first sheet tail region disposed adjacent the core tail region. The second fiber sheet may include a second sheet nose region and a second sheet tail region. The second sheet may extend along the second core outer surface with the second sheet nose region disposed adjacent the core nose region and the second sheet tail region disposed adjacent the core tail region.

The core may include a core recess formed therein. A board insert may be disposed within the core recess. The board insert may include a housing element defining a housing cavity. A portion of the board insert may be formed from a polymer material, such as the housing element. A lip may be coupled to the housing element. A pre-impregnated ("pre-preg") flange may be coupled to the housing element and may extend radially outward therefrom. The housing element may be bonded to the first fiber sheet via the pre-preg flange.

According to another embodiment, there is provided a method of forming a fin for a water sports board. The method includes providing a core having a first core outer surface and an opposing second core outer surface, a first fiber sheet, and a second fiber sheet. The method further includes placing the core, the first fiber sheet, and the second fiber sheet in a pressure-forming device, with the first fiber sheet extending along the first core outer surface, and the second fiber sheet extending along the second core outer surface. A thermoplastic material is also placed within the pressure-forming device adjacent the first fiber sheet and the second fiber sheet. The thermoplastic material is in a solid state when it is placed within the pressure-forming device. The thermoplastic material is heated to cause the thermoplastic material to transition from the solid state to a molten state. A pressure is applied within the pressure-forming device and the molten thermoplastic material flows through the first fiber sheet and the second fiber sheet and bonds the first fiber sheet and the second fiber sheet to the core.

The method may further comprise the step of shrinking the first and second fiber sheets after the heating step. The shrinking step may load the first and second fiber sheets in tension. The shrinking step may include cooling the first and second fiber sheets.

The thermoplastic material may be pre-impregnated onto the first fiber sheet and second fiber sheet prior to the first and second fiber sheets being placed into the pressure-forming device.

The step of placing the thermoplastic material within the pressure-forming device may include placing a first thermoplastic film adjacent the first fiber sheet and a second thermoplastic film placed adjacent the second fiber sheet.

According to another aspect of the invention, there is provided a method of forming a water sports board. The method includes providing a core having a first core outer surface and an opposing second core outer surface, a first fiber sheet, and a second fiber sheet. The method further includes placing the core, the first fiber sheet, and the second fiber sheet in a pressure-forming device, with the first fiber sheet extending along the first core outer surface, and the second fiber sheet extending along the second core outer surface. A thermoplastic material is placed within the pressure-forming device adjacent the first fiber sheet and the second fiber sheet, with the thermoplastic material being in a solid state when it is placed within the pressure-forming device. The thermoplastic material is heated to cause the thermoplastic material to transition from the solid state to a molten state. A pressure is applied within the pressure-forming device, and the molten thermoplastic material flows through the first fiber sheet and the second fiber sheet and bonds the first fiber sheet and the second fiber sheet to the core.

The method may further include shrinking the first and second fiber sheets after the heating step. The shrinking step may load the first and second fiber sheets in tension. The shrinking step may include cooling the first and second fiber sheets.

The thermoplastic material may be pre-impregnated onto the first fiber sheet and second fiber sheet prior to the first and second fiber sheets being placed into the pressure-forming device.

The step of placing the thermoplastic material within the pressure-forming device may include placing a first thermoplastic film adjacent the first fiber sheet and a second thermoplastic film placed adjacent the second fiber sheet.

The method may further include providing a board insert and placing the board insert within a recess formed within the core. The board insert may include a pre-preg flange that is bonded to the housing element and the first fiber sheet.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and detailed description to indicate like elements.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, there is depicted a fin 10 for a water sports board 12, wherein the fin 10 includes one or more fiber sheets placed around an inner core to provide enhanced structural properties relative to conventional water sports board fins. For instance, the fiber sheets may allow the fin 10 to be more lightweight than conventional fins, while also exhibiting enhanced strength and flex characteristics.

As used herein the term "fin" refers to a structure extending from a water sports board 12, typically from the tail of the water sports board 12, wherein the fin 10 is configured to improve directional stability and control of the water sports board 12. It is understood that a given water sports board 12 may be fitted with one or more fins 10, which may vary in size and may be positioned on the board 12 to enhance the overall performance of the board 12.

As used herein, the term "water sports board" refers to a broad class of devices, including but not limited to, surfboards, standup paddle boards, skimboards, windsurf boards, boogie boards, paddle boards, wake boards, kite surfing boards, or similar recreational equipment.

Figure 1:
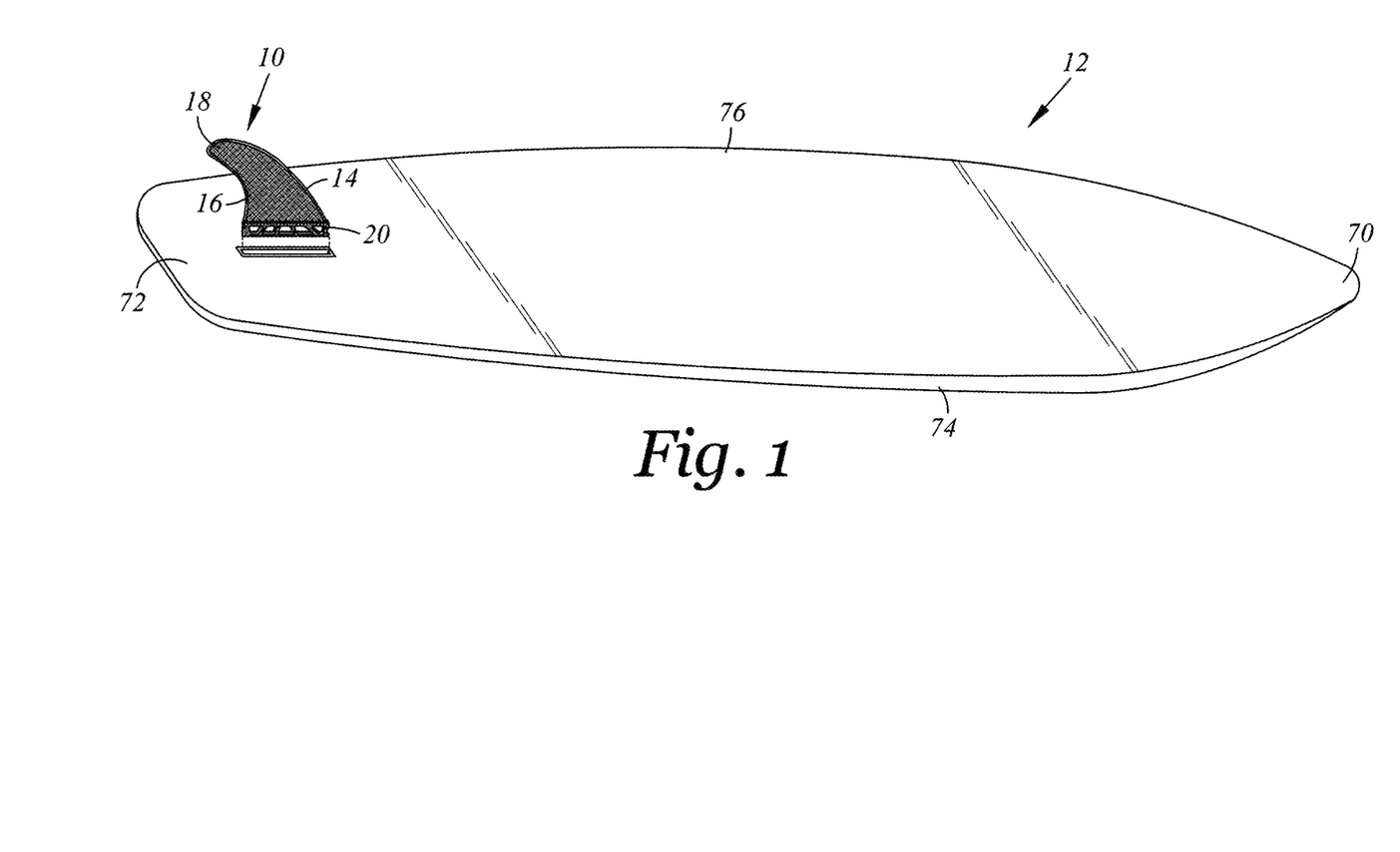
FIG. 1 is an exploded perspective view of a fin and a portion of a water sports board.

Referring now to FIG. 1, there is depicted a fin 10 and a water sports board 12, wherein the fin 10 includes a fin leading edge 14 and a fin trailing edge 16, wherein the fin leading edge 14 and the fin trailing edge 16 converge at a fin distal tip portion 18. The fin 10 also includes a tang or base 20 that is attachable to the water sports board 12, with the base 20 being opposite the fin tip portion 18 and extending between the fin leading edge 14 and the fin trailing edge 16.

Figure 2A:
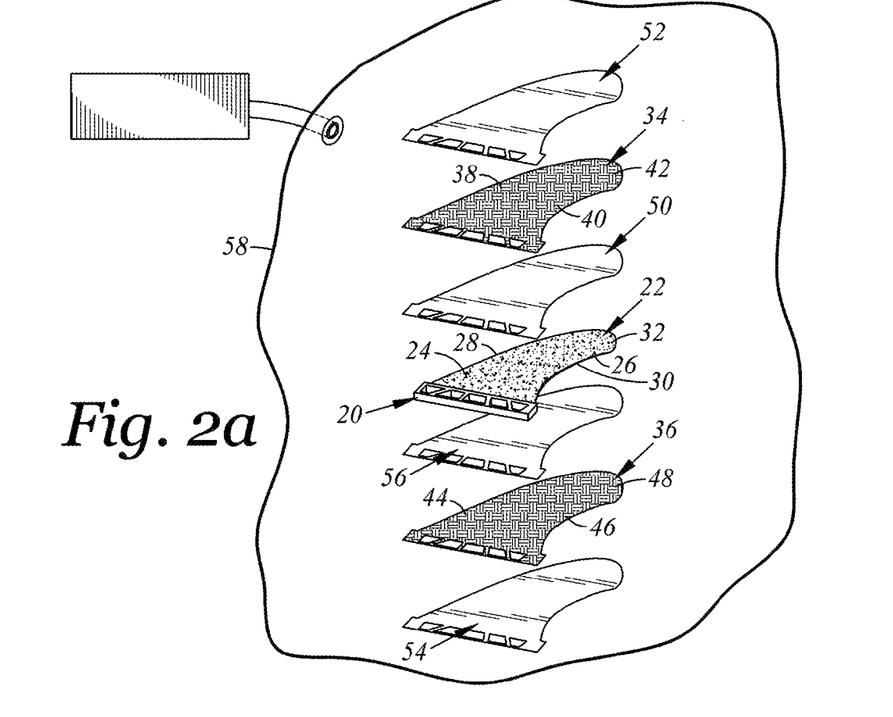
FIG. 2a is an upper perspective exploded view of one embodiment of a fin including dry fiber sheets disposed between pairs of thermoplastic films on opposed sides of a fin core, the fin being disposed within a vacuum bag prior to heating and vacuum steps.

Referring to FIG. 2a, the fin 10 includes a core 22 coupled to the base 20, wherein the core 22 includes a first core outer surface 24 and an opposing second core outer surface 26. According to one embodiment, the core 22 is formed of a foam material, while the base 20 is separate from the core 22 and is formed from a material that mitigates water absorption. However, in other embodiments, it is contemplated that the base 20 may be formed of a foam material, and thus, may be unitary with the core 22, so long as the foam base 20 is substantially encapsulated by an outer water resistant coating.

The core 22 preferably corresponds to the outer configuration of the finished fin 10, although it is understood that variations between the shape of the core 22 and the final shape of the fin 10 may exist without departing from the spirit and scope of the present invention. As shown in FIG. 2a, the core 22 includes a core leading region 28 and a core trailing region 30, wherein the core leading region 28 and core trailing region 30 converge at a core tip region 32.

The fin 10 further includes a first fiber sheet 34 and a second fiber sheet 36 disposed externally relative to the core 22. As used herein, the term "fiber sheet" refers to a sheet of structural strands. The structural strands may include carbon fiber strands, Kevlar™ strands, or strands formed from other materials known in the art. The structural strands preferably exhibit high tensile strength and toughness, as well as improved density, elastic modulus and Young's modulus. The structural strands located within a given fiber sheet may be arranged in a woven configuration, or alternatively, in a non-woven configuration.

According to one embodiment, the first fiber sheet 34 includes a first sheet leading region 38 and a first sheet trailing region 40, wherein the first sheet leading region 38 and first sheet trailing region 40 converge at a first sheet tip region 42. The first fiber sheet 34 extends along the first core outer surface 24 with the first sheet tip region 42 being disposed adjacent the core tip region 32, the first sheet leading region 38 being disposed adjacent the core leading region 28 and the first sheet trailing region 40 being disposed adjacent the core trailing region 30.

Although the first fiber sheet 34 is described as extending "along" the first core outer surface 24, it is understood that extending "along" the core 22 does not require that the first fiber sheet 34 is in direct contact with the core 22. In this respect, one or more intervening structures, such as adhesives, coatings, films etc., may be disposed between the core 22 and the first fiber sheet 34. Thus, the first fiber sheet 34 may be positioned near the core 22, but not necessarily in direct contact with the core 22 when the first fiber sheet 34 extends along the core 22.

According to one embodiment, the second fiber sheet 36 may be shaped similar to the first fiber sheet 34 and includes a second sheet leading region 44 and a second sheet trailing region 46. The second sheet leading region 44 and second sheet trailing region 46 converge at a second sheet tip region 48. The second fiber sheet 36 extends along the second core outer surface 26 with the second sheet tip region 42 being disposed adjacent the core tip region 32, the second sheet leading region 44 being disposed adjacent the core leading region 28 and the second sheet trailing region 46 being disposed adjacent the core trailing region 30.

As described above in relation to the first fiber sheet 34, the second fiber sheet 36 is not necessarily in direct contact with the core 22; the second fiber sheet 36 may be disposed near the core 22 and extend "along" the core 22.

Although FIG. 2a shows the core 22, first fiber sheet 34, and second fiber sheet 36 defining nearly identical configurations, it is understood that other embodiments of the fin 10 may include a core 22, first fiber sheet 34, and second fiber sheet 36, wherein each define unique and distinct configurations relative to each other. In this respect, the core 22 may be shaped as shown in FIG. 2a, and the first and second fiber sheets 34, 36 may be significantly larger than the core 22. In this respect, the first and second fiber sheets 34, 36 may be cut/trimmed and finished to size later in the manufacturing process.

According to one embodiment, the first fiber sheet 34 is separate from the second fiber sheet 36, although the outer edges of the first and second fiber sheets 34, 36 may be disposed next to each other to collectively encapsulate most, if not all, of the core 22. In one implementation, the edges of the first and second fiber sheets 34, 36 may convene adjacent the leading and trailing regions of the core 22, although the edges of the sheets 34, 36 may convene at any location on the core 22. It is also contemplated that portions of the first and/or second fiber sheets 34, 36 may wrap around the leading and/or trailing regions of the core 22, such that there is a degree of overlap between the first and second fiber sheets 34, 36. Furthermore, it is also contemplated that the first and second fiber sheets 34, 36 may be integrated into a single continuous sheet which wraps around the leading and trailing regions of the core 22.

It is additionally contemplated that in other embodiments, the first and second fiber sheets 34, 36 may extend all the way from the tip 32 of the core 22 to the base 20, and substantially between the leading and trailing regions 28, 32 of the core 22. Alternatively, the fiber sheets 34, 36 may extend only partially between the tip 32 and base 20, as well as only partially between the leading and trailing regions 28, 32 of the core 22. In this respect, the outer periphery of the first and/or second fiber sheets 34, 36 may be offset from the periphery of the core 22.

According to one embodiment, a thermoplastic material impregnates the first fiber sheet 34 and the second fiber sheet 36 and bonds the first fiber sheet 34 and the second fiber sheet 36 to the core 22. The thermoplastic material may define or otherwise form a fin outer surface including the fin leading edge 14 and fin trailing edge 16. It is expressly contemplated that separate resins, sheets or layers may be applied to the fin outer surface without departing from the spirit and scope of the present invention. Furthermore, although the exemplary embodiment shows a fin 10 having only a pair of fiber sheets 34, 36 disposed on opposed sides of the core 22, it is also contemplated that other embodiments may include several layers of fiber sheets. In other words, several layers of fiber sheets may be applied and stacked on each side of the core 22. The number of layers may be the same on the opposed sides of the core 22, or alternatively, the number of layers may differ on the opposed sides of the core 22. The stacked layers of fiber sheets may have different patterns of structural strands and may be formed of different materials to achieve specific structural characteristics.

There are several methods for impregnating the fiber sheets 34, 36 with the thermoplastic material, as will be described in more detail below. FIG. 2a shows a first embodiment, wherein the first and second fiber sheets 34, 36 are impregnated by thermoplastic films 50, 52, 54, 56. In this respect, the first and second fiber sheets 34, 36 begin as dry fiber sheets, which are positioned between a respective pair of thermoplastic films. In particular, the first dry fiber sheet 34 is positioned between a first pair of thermoplastic films 50, 52, while the second dry fiber sheet 36 is positioned between a second pair of thermoplastic films 54, 56.

The core 22, the fiber sheets 34, 36 and the thermoplastic films 50, 52, 54, 56 are placed in a pressure-forming device 58, with the first fiber sheet 34 extending along the first core outer surface 24, and the second fiber sheet 36 extending along the second core outer surface 26. In particular, the fiber sheets 34, 36 are placed adjacent opposed surfaces of the core 22, with each fiber sheet 34, 36 being placed between a respective pair of thermoplastic films such that the leading edges and trailing edges of the fiber sheets 34, 36 and films 50, 52, 54, 56 are positioned in corresponding alignment with the leading region and trailing region of the core 22. The pressure-forming device 58 may include a vacuum device including vacuum bag connectable to a vacuum source, or other vacuum forming devices (e.g., vacuum mold) known by those skilled in the art. It is also contemplated that the pressure-forming device 58 may include a device which uses heat and pressure, such as a hot stamping machine. Conventional hot stamping machines utilize hard molds which are heated and a pressure is applied thereto to crush the structure into shape.

Figure 3:
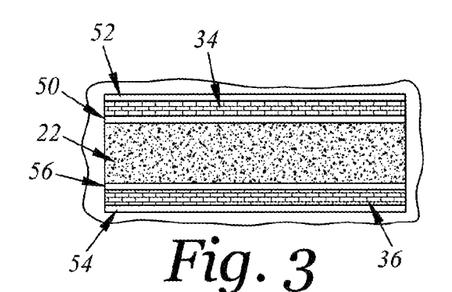
FIG. 3 is a cross sectional view of the fin shown in FIG. 2a prior to the heating and vacuum steps.

After the core 22, the fiber sheets 34, 36, and the thermoplastic films 50, 52, 54, 56 are placed in the vacuum device 58, the assembly is heated and a vacuum is applied by the vacuum device 58. Along these lines, the thermoplastic films 50, 52, 54, 56 are in a solid state when they are initially placed within the vacuum device 58. As used herein, the term "solid state" is used broadly to encompass films which are extremely rigid, as well as films which are extremely pliable and exhibit gel-like characteristics. FIG. 3 shows a partial cross section of the assembly prior to heat being applied thereto.

Figure 4:
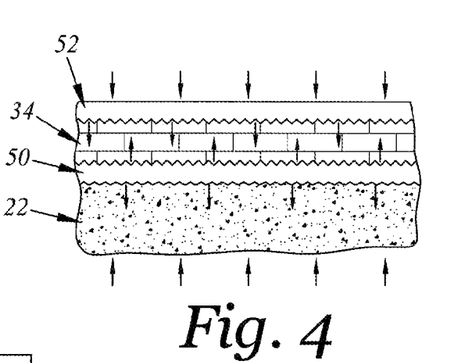
FIG. 4 is a cross sectional view of the fin shown in FIG. 2a during the heating and vacuum step with the melted thermoplastic flowing through the fiber sheet and toward the core.

As heat is applied to the assembly, the thermoplastic material 50, 52, 54, 56 transitions from the solid state to a molten state. The vacuum causes the molten thermoplastic material to flow through the first fiber sheet 34 and the second fiber sheet 36 and bond the first fiber sheet 34 and the second fiber sheet 36 to the core 22. FIG. 4 is a cross sectional view showing the molten thermoplastic material 52, 50 flowing into and permeating the fiber sheet 34.

Figure 5:
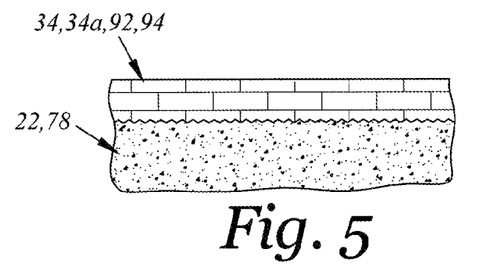
FIG. 5 is a side view of the fiber sheet impregnated with melted thermoplastic material and bonded to the core via the thermoplastic material.

Once the molten thermoplastic material 50, 52, 54, 56 flows through the first and second fiber sheets 34, 36, the vacuum is stopped and the assembly is allowed to cool. During the cooling process, the thermoplastic material 50, 52, 54, 56 hardens to create the bond between the fiber sheets 34, 36 and the core 22. FIG. 5 is a partial cross sectional view of the thermoplastic material permeated through the fiber sheet 34 and bonding the fiber sheet 34 to the core 22.

According to one embodiment, the cooling of the thermoplastic material 50, 52, 54, 56 causes the thermoplastic material 50, 52, 54, 56 to shrink, which in turn, pre-loads the first and second fiber sheets 34, 36 in tension. More specifically, the cooling may stretch the fiber sheets 34, 36 to create a dynamic, pre-loaded condition. This results in stored potential energy being locked into the fin 10, which increases resiliency. Thus, when the fin 10 is flexed, the fin 10 is more responsive because the materials are already stretched, dynamic and lively, and thus, the amount of deflection needed to reach elastic response is decreased. This, in turn, increases the performance of the fin 10.

Figure 2B:
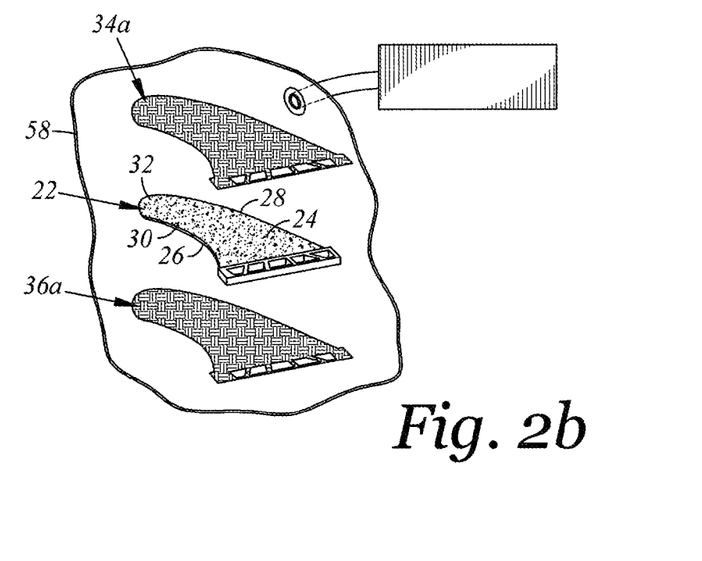
FIG. 2b is an upper perspective exploded view of another embodiment of a fin including a pair of pre-preg fiber sheets disposed on opposed sides of a fin core, the fin being disposed within a vacuum bag prior to a heating and vacuum step.

Referring now to FIG. 2b there is shown another embodiment, wherein instead of using dry fiber sheets interposed between thermoplastic films, the fin 10 is constructed using pre-impregnated sheets 34a, 36a ("pre-preg sheets"), wherein the fiber sheets 34a, 36a are pre-impregnated with a thermoplastic material. The resultant fin 10 is essentially the same as the fin described above, with a fiber sheet(s) disposed adjacent the core 22 and bonded to the core 22 via the thermoplastic material.

When the fin 10 is formed using the pre-preg sheets 34a, 36a, the pre-preg sheets 34a, 36a are placed adjacent opposed surfaces 24, 26 of the core 22 within a vacuum device 58. Heat and vacuum are applied to the pre-preg sheet and core assembly to cause the pre-impregnated thermoplastic material to transition to a molten state to permeate through the fiber sheets toward the core 22 and the outer surface of the respective fiber sheet. Although FIG. 5 was initially discussed above in relation to the method using dry fiber sheets 34, 36 and thermoplastic films 50, 52, 54, 56, FIG. 5 also represents the pre-impregnated thermoplastic completely permeating the fiber sheet 34a.

When the thermoplastic has completely permeated through the sheets 34a, 36a to the core 22, the heat and vacuum are stopped and the thermoplastic material is allowed to cool. The cooling causes the thermoplastic to harden, which may pre-load the fiber sheets 34a, 36a, as described in more detail above.

Although the foregoing relates to a fin 10 and related methods of forming the same, it is additionally contemplated that other aspects of the invention relate to forming other structures having an inner core and one or more outer fiber sheets. Along these lines, another aspect of the invention relates to a water sports board 12 constructed in a manner similar to the fin 10 described above. In this respect, the water sports board 12 includes a fiber sheet bonded to a core using a thermoplastic material.

Figure 6:
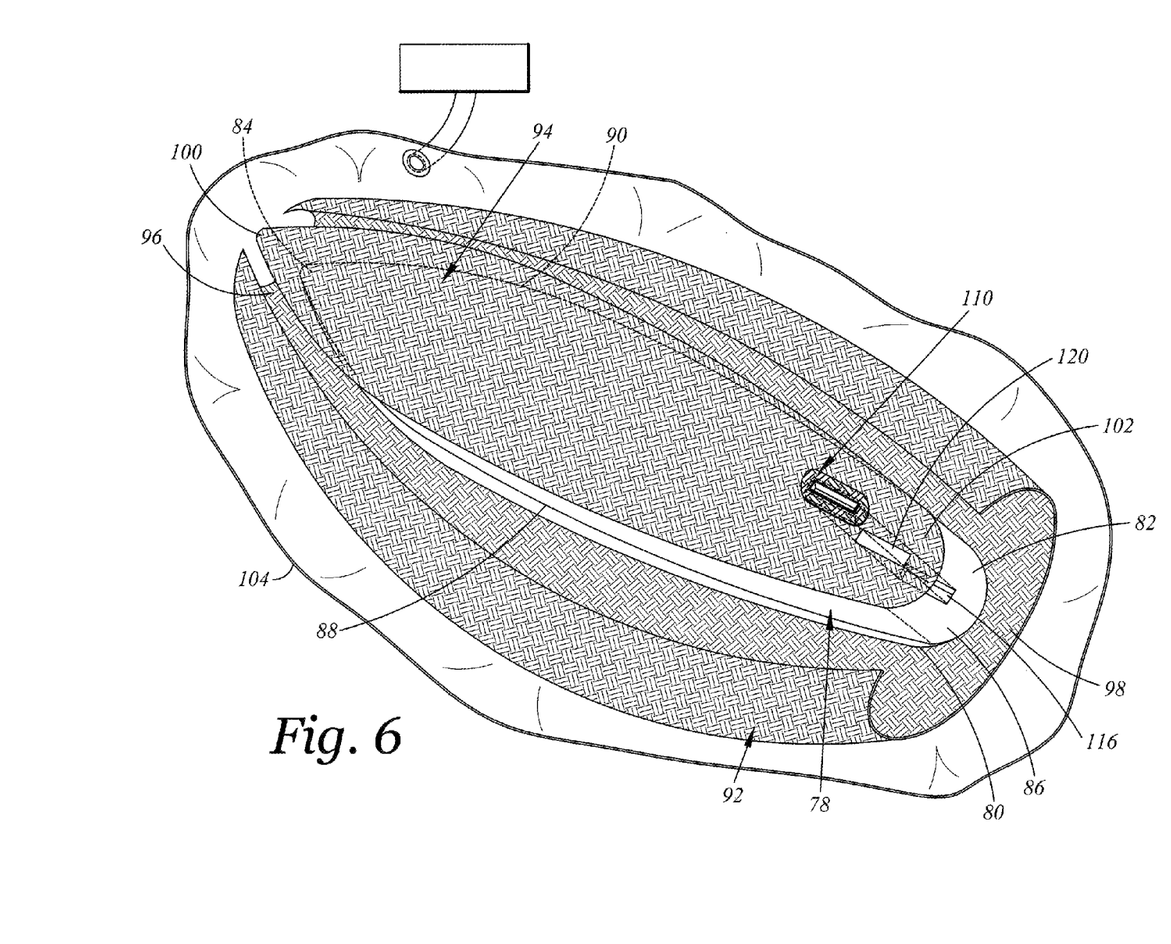
FIG. 6 is an upper perspective view of a surfboard having a core, pre-preg sheet and an insert box, the surfboard disposed within a vacuum bag prior to heating and vacuum steps.

According to one embodiment, and referring back to FIG. 1, the water sports board 12 includes a board nose region 70, an opposed board tail region 72, and a pair of opposed rails 74, 76 extending between the board nose region 70 and the board tail region 72. Referring now to FIG. 6, the water sports board 12 further includes a core 78 having a first core outer surface 80 and an opposing second core outer surface 82. The core 78 includes a core nose region 84 and an opposed core tail region 86 and a pair of opposed core rails 88, 90 extending between the core nose region 84 and the core tail region 86. The core 78 is preferably formed from a foam material, although other materials known in the art may also be used without departing from the spirit and scope of the present invention.

Referring now to FIG. 6, the water sports board 12 includes a first fiber sheet 92 extending along the first core outer surface 80 and a second fiber sheet 94 extending along the second core outer surface 82. It is understood that the first and second fiber sheets 92, 94 may extend along the first core outer surface 80 and second core outer surface 82, respectively, without directly contacting the first and second core outer surfaces 80, 82.

The first fiber sheet 92 includes a first sheet nose region 96 and a first sheet tail region 98. The first fiber sheet 92 extends along the first core outer surface 80 with the first sheet nose region 96 disposed adjacent the core nose region 84 and the first sheet tail region 98 disposed adjacent the core tail region 86.

The second fiber sheet 94 includes a second sheet nose region 100 and a second sheet tail region 102. The second sheet 94 extends along the second core outer surface 82 with the second sheet nose region 100 disposed adjacent the core nose region 84 and the second sheet tail region 102 disposed adjacent the core tail region 86.

A thermoplastic material impregnates the first fiber sheet 92 and the second fiber sheet 94 and bonds the first fiber sheet 92 and the second fiber sheet 94 to the core 78, and defines or otherwise forms a board outer surface.

The embodiment shown in FIG. 6 includes a board core 78, as well as first and second fiber sheets 92, 94 disposed within a vacuum device 104. The fiber sheets 92, 94 shown in FIG. 6 are pre-preg sheets having a thermoplastic material already impregnated therein, such that when heat and vacuum are applied, the pre-impregnated thermoplastic material melts and permeates through the respective fiber sheet 92, 94 to the core 78 and toward the outer surface of the sheet 92, 94. However, it is also understood that the board 12 may be formed using dry sheets which become impregnated by thermoplastic films, as will be described in more detail below.

The method of forming the water sports board 12 using the pre-preg sheets 92, 94 is similar to the method described above in relation to forming the fin 10 starting with the arrangement depicted in FIG. 2b. In this respect, when the water sports board 12 is formed using the pre-preg sheets 92, 94, the pre-preg sheets 92, 94 are placed adjacent opposed surfaces of the core 78 within the vacuum device 104. Heat and vacuum are applied to the pre-preg sheet and core assembly to cause the pre-impregnated thermoplastic material to transition to a molten state to permeate through the fiber sheets toward the core 78, as well as toward the outer surface of the respective fiber sheet 92, 94. FIG. 5 also represents the pre-impregnated thermoplastic completely permeating the fiber sheets 92, 94.

When the thermoplastic has completely permeated through the sheets 92, 94 to the core 78, the heat and vacuum are stopped and the thermoplastic material is allowed to cool. The cooling causes the thermoplastic to harden, which may pre-load the fiber sheets 92, 94, as described in more detail above.

Although the foregoing describes forming the water sports board 12 using pre-impregnated fiber sheets, it is also contemplated that the water sports board 12 may be formed using dry fiber sheets and thermoplastic films, similar to the method used in connection with forming the fin 10 starting with the arrangement in FIG. 2a. In this regard, the core 78, fiber sheets, and thermoplastic films are placed in the vacuum device 104 in a stacked arrangement. In particular, the fiber sheets are placed adjacent opposed surfaces of the core 78, with each fiber sheet being placed between a respective pair of thermoplastic films in corresponding alignment with the core 78.

After the core 78, the fiber sheets, and the thermoplastic films are placed in the vacuum device 104, the assembly is heated and a vacuum is applied to the vacuum device 104. Along these lines, the thermoplastic film is in a solid state when it is placed within the vacuum device. As heat is applied to the assembly, the thermoplastic material transitions from the solid state to a molten state. The vacuum causes the molten thermoplastic material to flow through the fiber sheets and bond the fiber sheets to the core.

Once the molten thermoplastic material flows through the first and second fiber sheets, the vacuum is stopped and the assembly is allowed to cool. During the cooling process, the thermoplastic material hardens to create the bond between the sheets and the core 78.

It is understood that various aspects of the invention relate to a water sports board 12 constructed for use with a fin 10, such as a fin discussed above, or other fins known in the art. In this respect, one embodiment of the invention includes forming the water sports board 12 to include a mounting insert 110 for attaching the fin 10 to the water sports board 12. According to one embodiment, the insert 110 includes a central housing 112 and a flange 114 extending radially outward from the central housing 112, wherein at least a portion of the insert 110 is formed from an impregnated fiber sheet and another portion of the insert 110 is formed from an injection molded material. In the exemplary embodiment shown in FIGS. 6 and 7, the flange 114 is formed from a fiber sheet and the central housing 112 is formed from the injection molded material. The fiber sheet used in forming the flange 114 may be a pre-impregnated fiber sheet, or a dry fiber sheet. For more information regarding the insert 110, please refer to U.S. patent application Ser. No. 14/251,876, the contents of which are expressly incorporated herein by reference.

Figure 7:
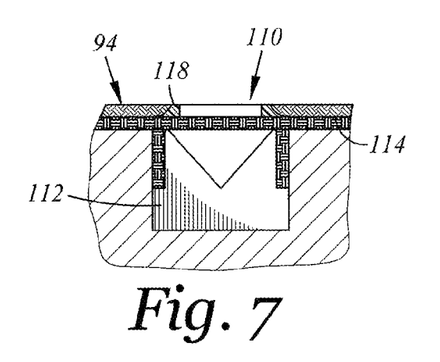
FIG. 7 is a side view of the insert box coupled to the core.

During the formation of the water sports board 12, a recess 116 is formed in the core 78 of the board 12 and the insert housing 112 is placed within the recess 116, with the flange 114 extending over an external surface 82 of the core 78. According to one embodiment, one of the first or second fiber sheets 92, 94 may extend over the flange 114 and around the lip 118 of the insert 110, as shown in FIG. 7. In this respect, the fiber sheet 94 may include an opening 120 sized and configured to extend around the lip 118, while also allowing a degree of overlap between the sheet 94 and the flange 114. The direction of the fibers in the board fiber sheets 92, 94 and the direction of the fibers in the insert fiber sheet may be specifically arranged to provide specific structural characteristics, such as resistance to bending or enhanced strength in a certain direction.

When heat and vacuum are applied to the assembly, the thermoplastic material permeates through the fiber sheet 94 and the fiber flange 114 to bond the fiber sheet 94 to the flange 114. In this respect, the fiber flange 114 serves as an intermediate bonding structure between the insert housing 112 and the fiber sheet 94 to provide a strong and secure attachment of the insert 110 to the water sports board 12.

Although the foregoing describes the insert 110 as being used as a fin box insert for connecting the fin 10 to the water sports board 12, it is additionally contemplated that the insert 110 may be configured for other uses, such as a hand grip, auxiliary mount (i.e., gps mount, camera mount), etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a fin for a water sports board, the method comprising the steps of:
   providing:
      a core having a core leading edge, a core trailing edge converging with the core leading edge at a core tip region, a first core outer surface and an opposing second core outer surface;
      a first fiber sheet; and
      a second fiber sheet;
   placing the core, the first fiber sheet, and the second fiber sheet in a pressure-forming device, the first fiber sheet extending along the first core outer surface, and the second fiber sheet extending along the second core outer surface;
   placing a thermoplastic material within the pressure-forming device adjacent the first fiber sheet and the second fiber sheet, the thermoplastic material being in a solid state when it is placed within the pressure-forming device, the thermoplastic material is a first thermoplastic film and a second thermoplastic film, the first thermoplastic film being placed adjacent the first fiber sheet between the first fiber sheet and the pressure-forming device, the second thermoplastic film being placed adjacent the second fiber sheet between the second fiber sheet and the pressure-forming device;
   heating the thermoplastic material to cause the thermoplastic material to transition from the solid state to a molten state; and
   applying a pressure within the pressure-forming device, the molten thermoplastic material flowing through the first fiber sheet and the second fiber sheet encapsulating the first and second fiber sheets to form a fin outer surface and bonding the first fiber sheet and the second fiber sheet to the core.

2. The method recited in claim 1, further comprising the step of shrinking the first and second fiber sheets after the heating step.

3. The method recited in claim 2, wherein the shrinking step loads the first and second fiber sheets in tension.

4. The method recited in claim 2, wherein the shrinking step includes cooling the first and second fiber sheets.

* * * * *